United States Patent
Kacin et al.

(10) Patent No.: US 9,667,477 B2
(45) Date of Patent: May 30, 2017

(54) DEAD DROP NETWORK ARCHITECTURE

(71) Applicant: LARC Networks, Inc., Los Altos, CA (US)

(72) Inventors: Martin Kacin, Los Altos Hills, CA (US); Michael R. Gray, Dublin, OH (US)

(73) Assignee: LARC Networks, Inc., Los Altos, CA (US)

( * ) Notice: Subject to any disclaimer, the term of this patent is extended or adjusted under 35 U.S.C. 154(b) by 0 days.

(21) Appl. No.: 15/136,311

(22) Filed: Apr. 22, 2016

(65) Prior Publication Data

US 2016/0314307 A1  Oct. 27, 2016

Related U.S. Application Data

(60) Provisional application No. 62/151,188, filed on Apr. 22, 2015, provisional application No. 62/193,927, (Continued)

(51) Int. Cl.
*H04L 29/06* (2006.01)
*H04L 12/24* (2006.01)
(Continued)

(52) U.S. Cl.
CPC ...... *H04L 41/0681* (2013.01); *G06F 21/6245* (2013.01); *H04L 43/0876* (2013.01); *H04L 63/0428* (2013.01); *H04L 63/126* (2013.01)

(58) Field of Classification Search
CPC .... G06F 21/606; G06F 21/6218; G06F 21/31; G06F 21/6245; G06F 2221/2131;
(Continued)

(56) References Cited

U.S. PATENT DOCUMENTS 5,237,684 A  8/1993  Record et al.
6,088,804 A  7/2000  Hill et al.
(Continued)

OTHER PUBLICATIONS

Van Den Hooff, J. et al., "Vuvuzela: Scalable Private Messaging Resistant to Traffic Analysis," 2015, 2 pages, [Online] [Retrieved on Apr. 21, 2016] Retrieved from the Internet<URL:https://petsymposium.org/2015/papers/vandenhooff-vuvuzela-hotpets2015.pdf>.
(Continued)

*Primary Examiner* — Don Zhao
(74) *Attorney, Agent, or Firm* — Fenwick & West LLP

(57) ABSTRACT

A dead drop at a node in a dead drop domain exchanges data between a sender and a recipient. The recipient provides the sender with a dead drop identifier (DDID) referencing the dead drop. The sender sends the dead drop domain a write request including the DDID. Nodes within the domain forward the request to other nodes until the write request reaches the node containing the dead drop identified by the DDID. The node receives data from the sender and stores the data in the identified dead drop. The recipient sends the dead drop domain a read request including the DDID and nodes within the domain forward the request to other nodes until the read request reaches the node containing the dead drop identified by the DDID. The node retrieves the data from the dead drop and provides the data to the recipient.

18 Claims, 5 Drawing Sheets

Related U.S. Application Data filed on Jul. 17, 2015, provisional application No. 62/193,930, filed on Jul. 17, 2015, provisional application No. 62/214,124, filed on Sep. 3, 2015.

(51) Int. Cl.
   *H04L 12/26* (2006.01)
   *G06F 21/62* (2013.01)

(58) Field of Classification Search
   CPC ......... G06F 21/00; H04L 51/22; H04L 51/24; H04L 51/32; H04L 63/0245; H04L 63/061; H04L 63/101; H04L 9/0894; H04L 63/00; H04L 63/0272; H04L 63/0428; H04L 63/0442; H04L 63/107; H04L 63/306; H04L 9/006; H04L 41/0273; H04L 63/30; H04L 63/126; H04L 43/0876; H04L 41/0681
   See application file for complete search history.

(56) References Cited

U.S. PATENT DOCUMENTS

| | | | |
|---|---|---|---|
| 6,366,926 B1 | 4/2002 | Pohlmann et al. | |
| 6,654,782 B1 | 11/2003 | O'Brien et al. | |
| 6,954,753 B1* | 10/2005 | Jeran ................. | G06F 17/30091 |
| 8,082,224 B2 | 12/2011 | Marinescu | |
| 8,353,016 B1 | 1/2013 | Pravetz et al. | |
| 8,631,283 B1 | 1/2014 | Sivasubramanian et al. | |
| 2003/0133417 A1 | 7/2003 | Badt | |
| 2004/0177262 A1 | 9/2004 | Lee | |
| 2006/0085344 A1 | 4/2006 | Grim, III et al. | |
| 2007/0208823 A1* | 9/2007 | Shannon ........... | G06F 17/30997 709/217 |
| 2007/0256081 A1 | 11/2007 | Comer | |
| 2008/0307525 A1 | 12/2008 | Nickle | |
| 2009/0138481 A1 | 5/2009 | Chatley et al. | |
| 2009/0254392 A1* | 10/2009 | Zander ............... | G06F 21/6218 705/50 |
| 2011/0321148 A1 | 12/2011 | Gluck | |
| 2013/0167228 A1* | 6/2013 | Wong .................... | G06F 21/62 726/19 |
| 2013/0208893 A1* | 8/2013 | Shablygin ............ | H04L 9/0822 380/277 |
| 2013/0212704 A1 | 8/2013 | Shablygin et al. | |
| 2013/0346246 A1 | 12/2013 | Patel et al. | |
| 2014/0164776 A1* | 6/2014 | Hook ..................... | H04L 9/14 713/171 |
| 2014/0177589 A1* | 6/2014 | Sanderson ............ | H04W 40/36 370/331 |
| 2014/0281526 A1* | 9/2014 | Lindteigen .......... | H04L 63/0442 713/168 |
| 2014/0289555 A1 | 9/2014 | Grube et al. | |
| 2014/0351586 A1 | 11/2014 | Hook et al. | |
| 2015/0120602 A1 | 4/2015 | Huffman et al. | |
| 2015/0281344 A1* | 10/2015 | Grootwassink ....... | H04L 67/104 713/168 |

OTHER PUBLICATIONS

Van Den Hooff, J. et al., "Vuvuzela: Scalable Private Messaging Resistant to Traffic Analysis," SOSP'15, ACM, Oct. 4-7, 2015, pp. 1-16, [Online] [Retrieved on Apr. 21, 2016] Retrieved from the Internet<URL:http://people.csail.mit.edu/matei/papers/2015/sosp_vuvuzela.pdf>.

Hardesty, L., "Untraceable Text Messages—Guaranteed," MIT Computer Science and Artificial Intelligence Laboratory, Dec. 7, 2015, 2 pages, [Online] [Retrieved on Apr. 21, 2016] Retrieved from the Internet<URL:http://www.csail.mit.edu/untraceable_communication_guaranteed>.

"Send Secure Information, Passwords, Links, Dead Drop: One Time Dead Drop," bill@bigmojo.net, undated, 3 pages, [Online] [Retrieved on Apr. 21, 2016] Retrieved from the Internet<URL:https://dead-drop.me/>.

PCT International Search Report and Written Opinion, PCT Application No. PCT/US2016/029005, Jul. 26, 2016. 16 pages.

PCT International Search Report and Written Opinion, PCT Application No. PCT/US16/29002, Jul. 27, 2016, 13 pages.

PCT International Search Report and Written Opinion, PCT Application No. PCT/US16/41936, Oct. 19, 2016, 13 pages.

* cited by examiner

DEAD DROP NETWORK ARCHITECTURE

CROSS-REFERENCE TO RELATED APPLICATIONS

This application claims the benefit of U.S. Provisional Application No. 62/151,188, filed Apr. 22, 2015, which is incorporated by reference herein. This application claims the benefit of U.S. Provisional Application No. 62/193,927, filed Jul. 17, 2015, which is incorporated by reference herein. This application claims the benefit of U.S. Provisional Application No. 62/193,930, filed Jul. 17, 2015, which is incorporated by reference herein. This application claims the benefit of U.S. Provisional Application No. 62/214,124, filed Sep. 3, 2015, which is incorporated by reference herein.

BACKGROUND

1. Field of Art

The present invention generally relates to the field of computer networking and data storage and in particular to a network architecture for facilitating secure data exchange over a decentralized computer network and data storage architecture.

2. Background of the Invention

The Internet (including the Web) enables users of computers to quickly and easily exchange data. There is a wide range of applications that leverage this ability to exchange data to achieve powerful results for individuals and enterprises alike. Examples include email, file sharing, home automation, entertainment, data management, and more.

However, the way that data is exchanged over the Internet makes the data, and those who send the data, vulnerable to malicious actors. For instance, data moving between parties or stored on a remote server typically include information associated with the sender and the recipient. Accordingly, an interceptor of the data may associate the data with the parties. If the data contain sensitive information, it may leave the parties open to identity theft or other malicious acts. As a result, many users are discouraged from sharing important information via the Internet, thereby missing out on many of the advantages that are afforded to computer users.

SUMMARY OF THE INVENTION

According to embodiments of the invention, a method of exchanging data between a sender and a recipient is described. The method includes receiving, at a node of a dead drop domain, a write request from the sender to write data to a dead drop at the node. The dead drop is identified by a dead drop identifier (DDID). The method further includes writing the data to the dead drop identified by the DDID. The method further includes receiving, at the node of the dead drop domain, a read request from the recipient to read data from the dead drop identified by the DDID. The method further includes providing the data from the dead drop identified by the DDID to the recipient.

According to embodiments of the invention, a system for exchanging data between a sender and a recipient is described. The system includes a processor for executing computer program instructions. The system also includes a non-transitory computer-readable storage medium storing computer program instructions executable by the processor to perform steps. The steps include receiving, at a node of a dead drop domain, a write request from the sender to write data to a dead drop at the node. The dead drop is identified by a dead drop identifier (DDID). The steps further include writing the data to the dead drop identified by the DDID. The steps further include receiving, at the node of the dead drop domain, a read request from the recipient to read data from the dead drop identified by the DDID. The steps further include providing the data from the dead drop identified by the DDID to the recipient.

According to embodiments of the invention, a non-transitory computer-readable storage medium storing computer program instructions for exchanging data between a sender and a recipient. The computer program instructions are executable to perform steps. The steps include receiving, at a node of a dead drop domain, a write request from the sender to write data to a dead drop at the node. The dead drop is identified by a dead drop identifier (DDID). The steps further include writing the data to the dead drop identified by the DDID. The steps further include receiving, at the node of the dead drop domain, a read request from the recipient to read data from the dead drop identified by the DDID. The steps further include providing the data from the dead drop identified by the DDID to the recipient.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures.

It is noted that wherever practicable similar or like reference numbers may be used in the figures and may indicate similar or like functionality. This description occasionally uses reference numbers in combination with letters to designate items illustrated in the figures. Herein, a reference number used without an accompanying letter (e.g., "150") references any or all instances of the designated item, while a reference number used with an accompanying letter (e.g., "150A") refers to the specific item designated with that label in the figure.

Figure 1:
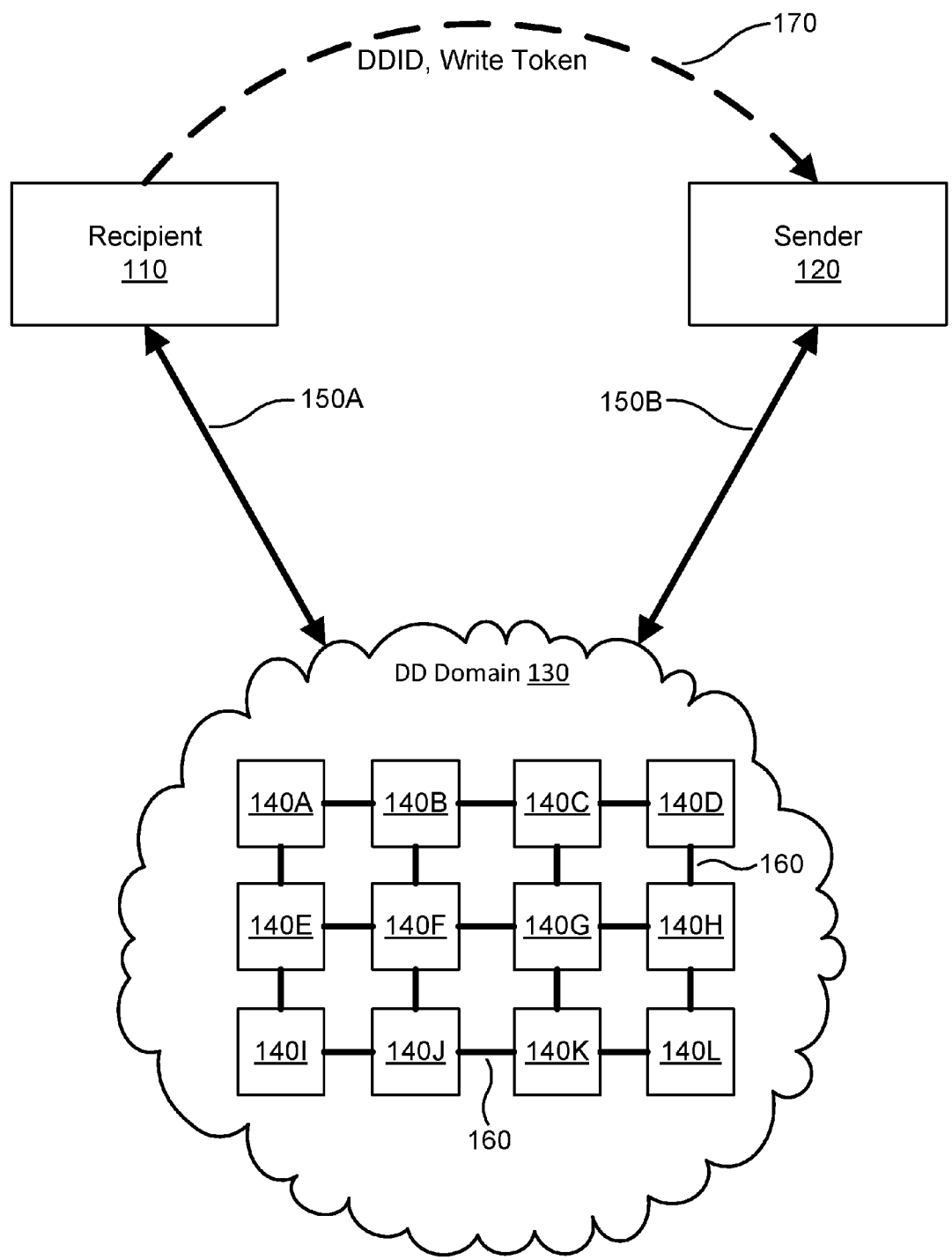
FIG. 1 is a high-level block diagram illustrating an example of passing data using a dead drop network architecture according to one embodiment.

FIG. 1 is a high-level block diagram illustrating an example of passing data using a dead drop network architecture according to one embodiment. FIG. 1 illustrates a recipient 110 in communication with a sender 120 via a dead drop (DD) domain 130. FIG. 1 describes a unidirectional data pass between a single sender 120 and a single recipient 110. Embodiments can have multiple senders 120 and recipients 110 engaged in bidirectional one-to-one and one-to-many communications.

Briefly, the recipient 110 uses the DD domain 130 to establish a communication channel that can be used to pass data to the recipient. The recipient 110 provides the sender 120 with a dead drop identifier (DDID) referencing a storage location within the DD domain. The sender 120, in turn, uses the DDID to pass data (e.g., send a message) to the recipient 110 via the DD domain 130. The data transmission from the sender 120 to the recipient 110 is secure in the sense that it is extremely difficult for a malicious actor or other third party to locate, intercept, or decipher the data. Thus, the DD network architecture is suited to communications where security and privacy concerns are paramount. In addition, the DD network architecture may be used to provide enhanced security for general purpose communications.

In one embodiment, the recipient 110 includes software executing on a computer used by a user (e.g., a person) to perform tasks such as communicating with other users via the DD domain 130 or via other communication networks. For example, the recipient 110 may include software executing on a desktop, notebook, or tablet computer, or another electronic device with computer functionality, such as a mobile telephone, music player, television set-top-box, home automation component, industrial equipment or connected appliance. The recipient 110 may include an input device such as a keyboard or touch-sensitive display that allows for the input of data and an output device such as a display or speaker that allows for the output of data. Functionality enabling the recipient 110 to communicate via the DD domain 130 may be embedded into the hardware of the recipient 110 and/or included in software executed by the recipient 110.

Similarly, the sender 120 includes a computer used by a user to perform tasks including communicating with other users via the DD domain 130 or via other communication networks. The sender 120 may include the same components as the recipient 110. In fact, the sender 120 may act as a recipient 110 and vice versa, depending upon the direction of data flow in a given communication transaction. The users who respectively use the recipient 110 and sender 120 to communicate can be different people or the same person.

The recipient 110 and sender 120 are connected to the DD domain 130 via respective communications links 150A, 150B. The communication links 150 may include network communication links using conventional computer networking technologies. For example, the communications links 150 may use wired or wireless network communications technologies such as the wired and wireless forms of Ethernet. Likewise, the communication links 150 may use other communications technologies designed to support communication with local peripherals, such as Universal Serial Bus (USB), Thunderbolt, Bluetooth, Personal Area Network (PAN), Serial ATA, infrared, heat signatures, and/or sound. The communications links 150 may be encrypted using any encryption technologies such as secure sockets layer (SSL), transport layer security (TLS), HTTP Secure (HTTPS), virtual private networks (VPNs), Internet Protocol security (IPsec), etc. In another embodiment, communication uses custom and/or dedicated data communications technologies instead of, or in addition to, the ones described above.

The DD domain 130 is a collection of one or more DD nodes 140 (labeled as nodes 140A-L in FIG. 1). A DD node 140 includes functionality for acting in the DD domain 130 and a memory for storing data within the domain. A typical DD domain 130 includes many DD nodes 140. Each node 140 is connected to one or more other nodes via DD communication links 160. The DD communication links 160 may use the same communication technologies as the communication links 150 used by the recipient 110 and sender 120 to connect to the DD domain 130. In one embodiment, the DD nodes 140 and DD communication links 160 are arranged within the DD domain 130 such that every node is reachable by every other node. In another embodiment, the DD nodes 140 are logically or physically partitioned so that some nodes cannot reach other nodes. The path connecting two DD nodes 140 may pass through one or more intermediate nodes. In addition, the recipient 150A and sender 150B communication links respectively connect the recipient 110 and the sender 120 to at least one DD node 140 within the DD domain 130. The recipient 110 and sender 120 may also communicate with each other using other communication links that do not pass through the DD domain 130.

To receive data using the DD domain 130, the recipient 110 sends a request to the DD domain 130 to create a DD on behalf of the recipient. A DD node 140 within the domain 130 receives the create request and either services the request or selects another node to service the request. For example, the DD node 140 that receives the request may randomly select another node within the DD domain 130 and pass the request to the selected node. The random selection may occur in a manner such that the node that receives the request does not know which node ultimately services the request.

The node 140 that services the request to create the DD establishes a DDID that uniquely identifies the created DD. In addition, the node 140 establishes a set of tokens associated with the DDID. A token describes the access rights a possessor of the token has with respect to the created DD. For example, an embodiment includes a read token giving a possessor of the token the right to read from the DD identified by the associated DDID and a write token giving the right to write to the DD identified by the associated DDID. The node 140 that services the request provides the DDID and the associated tokens to the recipient 110.

The recipient 110 typically stores the DDID and associated tokens in a secure manner. For example, the recipient 110 may store the DDID and tokens in an encrypted data store at the recipient. The recipient 110 provides the DDID and the write token to the sender 120 via a communications link 170. This communications link 170 may be a secure or unsecure link, and may include communication over the Internet and/or dedicated communications links. For example, the recipient 110 may use encrypted or unencrypted email to send the DDID and write token to the sender 120. Alternatively, the recipient may use a different electronic communications technique, such as short-range wireless communications, or even use non-electronic techniques to exchange the information (e.g., a pen and paper). In one embodiment, the DDID and one or more tokens are combined and may be encrypted or encoded (e.g., by a hashing function) to form a single code. In this embodiment, the recipient 110 may share the code with the sender 120 instead of sharing the DDID and write token separately. The code may be decoded, for example by the sender 120 or at a DD node 140, to determine the DDID and token.

In addition, the recipient 110 and sender 120 may choose to encrypt the data sent by the sender using one or more symmetric or asymmetric encryption techniques. The recipient 110 and sender 120 may choose to exchange encryption keys, if necessary, at the same time the recipient 110 provides the DDID and write token to the sender 120. Alternatively, the recipient 110 and sender 120 may exchange encryption keys at different times, may use encryption techniques that do not require a key exchange, or may choose not to encrypt the data. In one embodiment, the DD domain 130 itself is used to perform the key exchange needed to facilitate an encrypted communications link.

The sender 120 uses the DDID and associated write token to send data to the recipient 110. In one embodiment, the sender 120 sends a write request to the DD domain 130 that includes the DDID and the write token. This request is received by an initial DD node 140 in the DD domain 130. The receiving node 140 determines whether it has the DD identified by the DDID. If not, the receiving node 140 sends a message containing the DDID and the write token to the other nodes within DD domain 130. The node 140 storing the DD associated with the DDID receives the message and verifies the write token. If the token verifies, the node storing the DD creates a connection with the receiving node, which in turn has a connection with the sender 120. The sender 120 then writes the data to the node storing the DD associated with the DDID.

Similarly, the recipient 110 uses the DDID and associated read token to read data from the DD. In one embodiment, the recipient 110 sends a read request to the DD domain 130 that includes the DDID and the read token. This request is received by an initial DD node 140 in the DD domain 130. The receiving node 140 determines whether it has the DD identified by the DDID. If not, the receiving node 140 broadcasts a message containing the DDID and the read token the other nodes within the DD domain 130. The node 140 storing the DD associated with the DDID receives the message and verifies the read token. If the token verifies, the node 140 storing the DD creates a connection with the receiving node, which in turn has a connection with the recipient. The recipient 110 then reads the data from the node storing the DD associated with the DDID.

Thus, the DD network architecture described above permits secure and private communications between the recipient 110 and the sender 120. The sender 120, and/or other parties possessing the DDID and write token can send data to the recipient. However, such parties cannot read the data from the DD. Moreover, a malicious actor who obtains access to one or more nodes 140 in the DD domain 130 may be able to obtain or read data stored in individual DDs. But the malicious actor cannot determine the intended recipients of the data because there is no mapping of DDIDs to recipients. For the same reason, the malicious actor cannot determine the path between a sender and a recipient. In addition, the data stored in the DDs may be encrypted.

Figure 2:
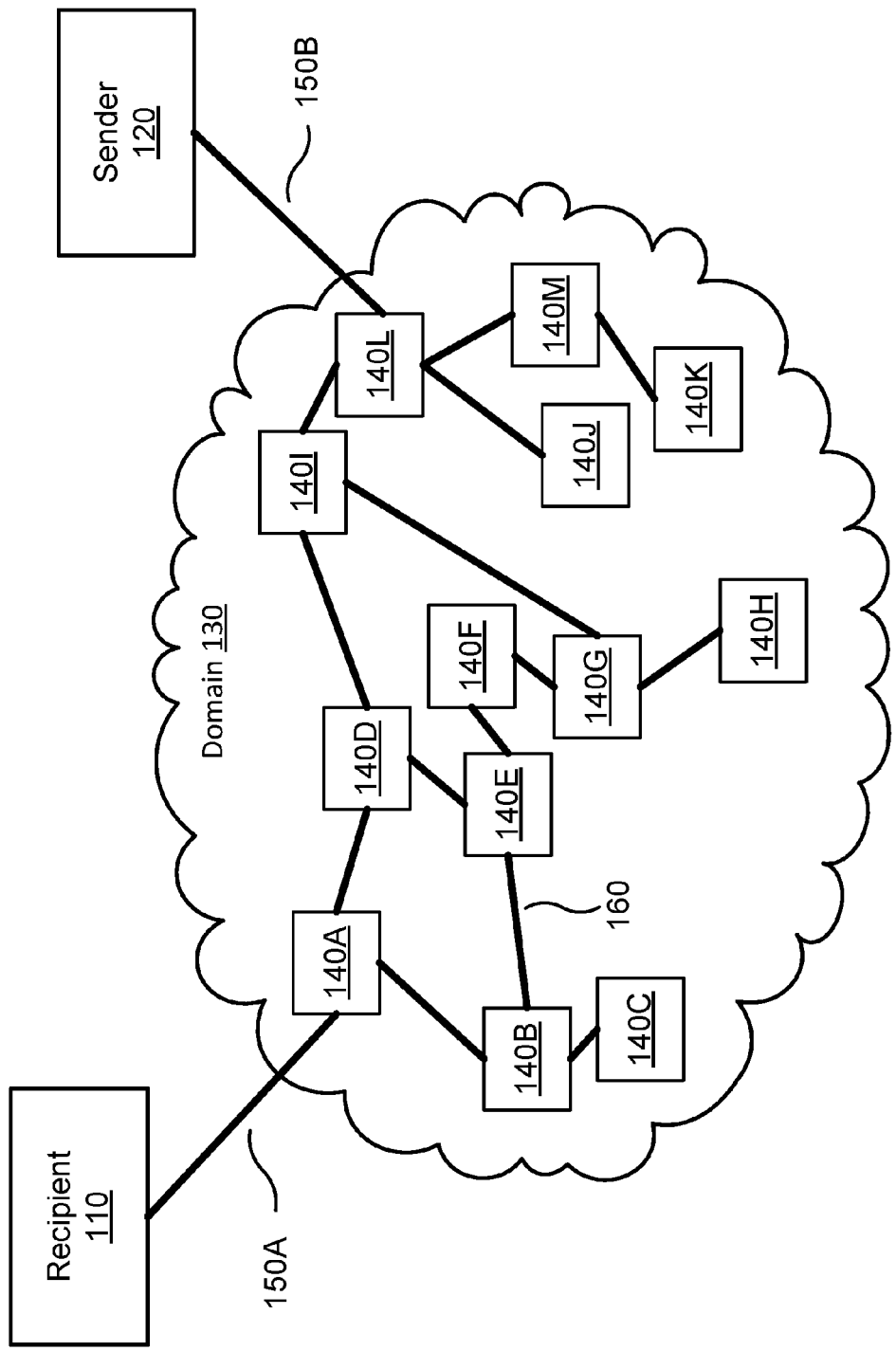
FIG. 2 is a high-level block diagram illustrating a detailed view of the dead drop domain of FIG. 1 according to one embodiment.

FIG. 2 is a high-level block diagram illustrating a detailed view of the DD domain 130 of FIG. 1 according to one embodiment. As described above, the domain 130 typically includes multiple DD nodes 140 connected by DD communication links 160. The individual nodes 140 within the DD domain 130 may be formed of physically separate computers, such as a collection of geographically disparate computers. In addition, some or all of the nodes may be formed of virtual computers. For example, the nodes 140 of a domain 130 may be instances of virtual computers hosted in a cloud environment.

Each DD node 140 has an associated set of characteristics that describe attributes of the node. The characteristics may describe the location of the node 140. The location may be specified as a geographic location. In addition, the location may be specified as a logical location (e.g., a "zone"). For example, the logical location may indicate that the node is associated with a particular enterprise (e.g., a business) or other group. The characteristics may also describe physical properties of the node, such as a node's processing power, storage capacity, uptime, and the like.

In one embodiment, the set of DD nodes 140 in a DD domain 130 may be divided into multiple subdomains, with each subdomain including a proper subset of nodes from the set of DD nodes in the DD domain. The subdomains to which a node 140 is member may be determined based on the characteristics of the node. For example, the DD domain 130 may include nodes 140 distributed over a wide geographic area (e.g., a country), and a subdomain may include nodes physically located within a smaller area (e.g., a state within the country). Similarly, the DD domain 130 may include nodes 140 associated with multiple enterprises, and a subdomain may include only nodes associated with one of the enterprises or a part of an enterprise.

In one embodiment, the DD nodes 140 are arranged as a mesh network. Each node 140 is connected to at least one other node via a DD communication link 160. Moreover, each node 140 maintains a routing table identifying the nodes to which it is connected. A node 140 can send a message to another node by forwarding the message to the nodes to which it is connected. The nodes 140 that receive the message in turn forward the message to other nodes, until the message reaches the node to which it is directed. The path followed by the message is formed of hops from node 140 to node along the DD communication links 160.

Consider the communications between the sender 120 and the recipient 110 described in FIG. 1 in the context of FIG. 2. As shown in FIG. 2, the recipient 110 is connected to a node 140A of the domain 130 via a communication link 150A. This node 140A serves as the point of ingress to the domain 130 for the recipient. The recipient 110 sends a request to the ingress node 140A of the domain 130 to create a DD on behalf of the recipient. This request may include domain information specifying a particular subdomain in which the DD should be created. For example, the domain information may specify that the DD should be created in a node 140 located in a particular geographic area or managed by a particular enterprise.

The node 140A serving as the point of ingress for the recipient 110 receives the create request and analyzes the domain information to identify the subdomain in which the DD should be created. In one embodiment, the node 140A services the request by randomly selecting a node within the specified subdomain that will host the DD. In one embodiment, random selection is performed using a load balancing technique, which may be performed by the node 140A or by a separate computing device. In one embodiment, the node 140 services the request by randomly selecting a number of node hops for which the request will be forwarded, and randomly selecting another node within the specified subdomain to which the node 140A is connected. The ingress node 140A then forwards the request to the randomly selected node (e.g., node 140D) and also forwards the selected value for the number of node hops. The node 140D to which the request was forwarded randomly selects another node (e.g., node 140E) in the subdomain from its routing table, decrements the value for the number of node hops, and forwards the request to the selected node. This selection, decrement, and forward process repeats until the value for the number of node hops reaches zero, at which point the final node establishes and hosts the DD associated with the request from the recipient 110. In one embodiment, each node that forwards the create request includes the path from the ingress node 150A to the forwarding node with the request. The final node that creates the DD uses the path to identify and contact the ingress node 140A for the recipient

110. For example, the node 140 may use the path to send the DDID and associated tokens to the ingress node 140A, so that the latter node can provide this information to the recipient.

For example, assume the ingress node 140A receives a create request from the recipient 110, and also assume that the request specifies a subdomain encompassing nodes 140A, 140D and 140E, as well as other nodes within the domain 130. Also assume the ingress node 140A randomly selects "2" as the number of hops. The ingress node randomly selects a node (e.g., node 140D) from the specified subdomain in its routing table, decrements the hop value, and forwards the request and decremented hop value (e.g., "1") to the selected node. That node 140D, in turn, randomly selects another node (e.g., node 140E), decrements the hop value, and forwards the request and decremented hop value (e.g., "0") to the selected node. The final node 140E evaluates the hop value and determines that it is "0" and, therefore, creates the DD and associated tokens. The final node 140E then returns the DDID and tokens to the ingress node 140A via the reverse of the path used to reach the final node.

Variations on the techniques described above may be used in some embodiments. In one embodiment, a node forwarding a request decrements the hop value only if the node is within the specified subdomain. This variation may be used, for example, in situations in which a node receiving a create request is not within the specified subdomain and/or connected to any other nodes in the subdomain. In this situation, the nodes may randomly forward the request to other nodes until a node within the specified subdomain receives the request, at which point the node in the subdomain decrements the hop value and forwards the request anew if the hop value is greater than zero or creates the DD and associated tokens if the hop value is zero.

The sender 120, in turn, is connected to a different node 140L that serves as the point of ingress for the sender to the domain 130 via a different communication link 150B. When the sender 120 makes a write request, the sender provides the DDID and write token to the sender's ingress node 140L. This node 140L forwards the request including the DDID and write token to the other nodes in its routing table, and the other nodes continue to forward the request until it reaches the node having the DD associated with the DDID (e.g., node 140E). This node 140E verifies the token and establishes a connection with the sender's ingress node 140L using a return path created by the forwarding nodes. Alternatively, the node 140E may establish a direct connection with the sender 120. The sender 120 provides the data to be written to the ingress node 140L, and that node forwards the data to the node 140E having the DD via the connection. A read request made by the recipient 110 is handled in a similar fashion in one embodiment, except that the recipient reads data from, rather than writes data to, the node 140E having the DD.

Figure 3:
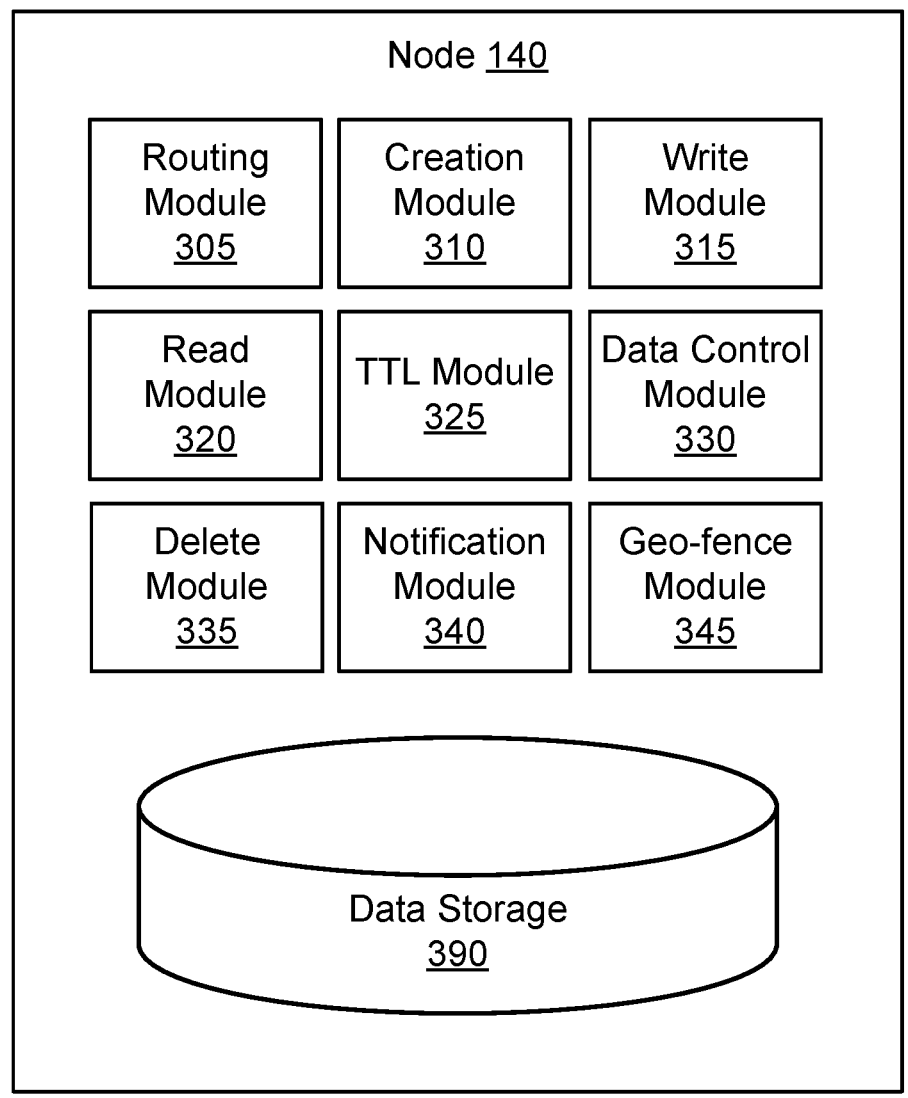
FIG. 3 is a high-level block diagram illustrating an example of a dead drop storage node according to one embodiment.

FIG. 3 is a high-level block diagram illustrating an example of a DD node 140 according to one embodiment. The node 140 includes a routing module 305, creation module 310, write module 315, read module 320, time-to-live (TTL) module 325, data control module 330, delete module 335, notification module 340, geo-fence module 345, and data storage 390. Other embodiments may include different or other modules in other embodiments. In addition, the behaviors of the modules may differ in other embodiments.

The data storage 390 stores data used by the node 140. The data may include data being maintained in DDs managed by the node 140, DDIDs and tokens associated with the DDs, and information used by the modules within the node 140 to perform the tasks described herein. Depending upon the embodiment, the data storage 390 may include one or more types of non-transitory computer-readable persistent storage media. For example, the data storage 390 may include a hard drive, solid-state memory device, and/or other form of persistent memory.

Turning now to the individual modules within the node 140, the routing module 305 routes messages received by node 140. As part of this task, an embodiment of the routing module 305 maintains the routing table for the node 140. The routing module 305 periodically communicates with other nodes 140 to which it is connected to ascertain information about those nodes. This information may include, for example, network addresses of the nodes, information about the subdomains with which the nodes 140 are associated, and the like. The routing module 305 stores this information about the connected nodes in the routing table. In addition, the routing module 305 responds to routing table-related communications from routing modules 305 of other nodes 140.

The messages handled by the routing module 305 include messages related to create requests, write requests, read requests, and other types of messages and requests described herein. For a given message, the routing module 305 analyzes the message to determine whether to process the message locally on the node 140 or to route the message to another node in the routing table. For example, upon receiving a create request from another node, the routing module 305 examines the hop value to determine whether it is greater than zero. If the hop value is greater than zero, the routing module 305 decrements the hop value, randomly selects a connected node in the routing table (subject to any specified subdomain constraints, if applicable), and forwards the request and decremented hop value to the selected node. If the hop value is zero, the routing module 305 provides the request to the creation module 310.

Similarly, upon receiving a write request, the routing module 305 determines whether the DDID is associated with a DD maintained by the node 140. If the DDID is not associated with a DD maintained by the node 140, the routing module 305 forwards the request to other nodes in its routing table. If, on the other hand, the DDID is associated with a DD maintained by the node, the routing module 305 provides the request to the write module 315. The routing module 305 handles read requests, as well as other requests described herein, in the same fashion.

The creation module 310 creates DDs in response to requests received by the node 140. Upon receiving a create request from the routing module 305, the creation module 310 generates a DDID to represent the DD for the request. In addition, the creation module 310 generates a set of tokens associated with the DDID. The creation module 310 provides the DDID and tokens to the recipient 110 that requested the DD using the path to the recipient's ingress node 140A as described with respect to FIGS. 1 and 2.

In one embodiment, the creation module 310 generates the DDID as a globally unique identifier (GUID). The DDID is a value represented using a large number of bits (e.g., a 128-bit value). A small portion of the bits may be fixed to identify the value as a DDID or encode other information, while the other bits are randomly generated by the creation module 310. The large number of bits makes it extremely unlikely that the same DDID would be generated for multiple DDs. Therefore, each DDID is unique for practical purposes. The DDID may be represented as sequence of hexadecimal digits.

In one embodiment, the tokens generated by the creation module 310 may include a write token, a read token, and an owner token. The write and read tokens respectively provide the bearer of the token the rights to write data to, and read data from, the DD associated with the DDID as described above. The owner token provides the bearer with administrative rights to the DD, such as the right to delete data within the DD or delete the entire DD.

In one embodiment, a token, like the DDID, is a value represented using a large number of bits, some of which may be fixed and others of which are randomly generated by the creation module 310. The number of bits in each token may be fewer than the number of bits in the DDID. Each token associated with a particular DDID is unique with respect to other tokens associated with that DDID.

The creation module 310 allocates space in the data storage 390 for the created DD and associates this space with the DDID. The amount of space, and the time when the space is allocated may vary in different embodiments. In one embodiment the creation module 310 allocates a fixed amount of storage space for the DD when creating the DD. In another embodiment, the creation module 310 allocates the storage space later, when receiving data to store in the DD. Likewise, the amount of space allocated for the DD can vary in different embodiments.

The write module 315 writes data to DDs in response to write requests received by the node 140. Upon receiving a write request from the routing module 305, the write module 315 initially verifies the write token included in the request. The write module 315 identifies the DDID and write token included in the request, and compares the write token to the stored write token created by the creation module 310 for the DDID. If the compared write tokens do not match, the write module 315 denies the write request. Depending upon the embodiment, the write module 315 can deny the request by acting as if the request was not received (i.e., by not sending any messages in response to the write request) or by sending a message to the sender 120 indicating that the write token is invalid.

If the compared write tokens match, the write module 315 uses the return path in the write request to open a network connection with the ingress node 140L for the sender 120. The write module 315 receives data from the sender of the write request, and writes the data to the storage allocated for the DD identified by the DDID. In one embodiment, the write module 315 stores the data in a DD as a series of discrete messages, such that the data for each write request to a DD is saved as a logically separate message. The stored messages for the DD are organized in a queue or another data structure.

The read module 320 reads data from DDs in response to read requests received by the node 140. Upon receiving a read request from the routing module 305, the read module 320 initially verifies the read token included in the request. The read module 320 identifies the DDID and read token included in the request, and compares the read token to the stored read token created by the creation module 310 for the DDID. If the compared read tokens do not match, the read module 320 denies the read request. Like the write module 315, the read module 320 can deny the request by acting as if the request was not received (i.e., by not sending any messages in response to the read request) or by sending a message to the recipient 110 indicating that the read token is invalid.

If the compared read tokens match, the read module 320 uses the return path in the read request to open a network connection with the ingress node 140A for the recipient 110. The read module 320 reads data from the storage allocated for the DD, and sends the data to the recipient 110 via the ingress node 140A. In another embodiment, a direct connection is established between the node storing the DD and the recipient 110 and the data is sent to the recipient without passing through the ingress node 140A. If the data in the storage is organized in a queue, an embodiment of the read module 320 sends the message in the queue in response to the request (e.g., in a first-in-first-out order) and removes the message from the queue after it is sent. Other embodiments may send multiple messages per read request and/or leave message in the queue after the messages are sent to the recipient 110. In another embodiment, the contents of a DD are not read, for example, because the holder of a read token corresponding to the DD no longer wishes to communicate with the sender of the message. In this case, communication may be disconnected unilaterally by the recipient, without action, consent, or knowledge by the sender.

The TTL module 325 maintains TTL information for the node 140. The TTL information generally describes for how long an entity persists in the domain 130. For example, DDs, DDIDs, tokens, and data written to DDs may have associated TTL information that describes how long the respective entities persist within the domain 130. Once the duration described by the TTL is reached, the entity to which the TTL pertains expires, is no longer recognized as valid, and may be deleted.

In addition, the TTL module 325 enforces the TTLs by detecting when a duration described by a TTL is reached, and invalidating the entity associated with the TTL. For example, if the TTL module 325 detects that a TTL for a DD is reached, the TTL module deletes the data stored within the DD and also deletes or otherwise invalidates the DDID and tokens associated with the DD so that the DD can no longer be accessed. Similarly, if the TTL module 325 detects that a TTL for data written to a DD is reached, the TTL module 325 deletes the data from the DD so the data can no longer be read.

The TTL information may be specified as a counter (e.g., a duration of time from the present time) or as a timestamp (e.g., an explicit time after which the entity is no longer valid). Additionally, the TTL may be specified as a number of instances of particular types of access (e.g., a DD expires once it is read from 3 times, or written to once). Further, the TTL information may be specified as a category (e.g., "default," "short," "medium," "long," or "confidential"). In the latter case, the TTL module 325 converts the category description to a counter or timestamp based on a TTL policy. Different entities may have different applicable TTL policies. For example, the TTL policies may specify that the "default" TTL for a DD is 30 days and the "default" TTL for a message is 7 days. The TTL module 325 may also support an "archive" TTL that does not expire, therefore making the entity having the TTL persistent.

In one embodiment, the recipient 110 specifies the TTL for a DD when creating it. For example, the TTL information may be embedded into the create request. Likewise, the sender 120 may specify the TTL for data by embedding the TTL in the write request. For example, the recipient 110 may specify a specific amount of time or number of instances of access for which the DD is valid, or specify a category as discussed above. The TTL specified for the DD is embedded into the create request and received by the TTL module 325.

The data control module 330 supports management of DDs for the nodes 140 of the domain 130. The data control module 330 provides a variety of management functions that can be accessed by the recipient 110 or other entity making a request for a particular function and providing tokens granting administrative authority, reading privilege, writing privilege, etc. for a given DD.

In one embodiment, the data control module 330 provides a movement function that moves a DD from one node 140 to another node while maintaining the same DDID. The recipient 110 may issue a move request that contains the DDID, the owner token and, optionally, a specification of a node to which the DD should be moved. In various embodiments, movement of a DD may be initiated by a user request, environmental factors (e.g., a node 140 is scheduled to be taken offline, time of day), or a policy definition (e.g., a DD may only stay on a specific node 140 for a certain time before it is required to be moved). The node 140 to which the DD should be moved may be specified, for example, by indicating a subdomain to which the DD should be moved. In response to a move request having a valid owner token, the data control module 330 of the node 140 having the DD identified by the DDID identifies a new node to which the DD is to be moved. For example, the data control module 330 may randomly select a new node within the specified subdomain using the random selection technique described above and send that node a message identifying the DDID and the data for maintaining in the DD identified by the DDID. A data control module 330 in the new node 140 establishes a new DD under the existing DDID, and stores the received data in that DD. Once the new DD is established, the data control module 330 may optionally delete the DD identified by the DDID so that the DD has effectively been moved to the new node.

The data control module 330 also provides a replicate function that replicates a DD from a node 140 to one or more other nodes. The replication is similar to the movement function, except that the original data control module 330 does not delete the DD identified by the DDID after the new DD is created. In one embodiment, replication is initiated by a recipient 110. In another embodiment, replication is initiated automatically (e.g., by executable instructions stored in the DD that specify rules for replication). When a node 140 containing a replicated DD fulfills a write request, the routing module 305 forwards the write request to other nodes in the routing table so that each instance of the replicated DD may fulfill the write request and maintain data currency.

The data control module 330 further provides an archive function that stores an archive of a DD in another node 140. To perform the archive, the data control module 330 of the node 140 storing the DD receives an archive request similar to the move request. The data control module 330 communicates with the data control module 330 of the new node 140 to create a new DD associated with the same DDID. The data control module 330 sets the TTL for the entities associated with the new DD as "persistent," meaning that the new DD acts as an archive for the DD in the original node. The data control module 130 of the original node 130 may optionally delete the DD identified by the DDID after the archive is created.

The delete module 335 deletes DDs from a node 140. The delete module 335 receives a delete request from the recipient 110 or another entity. The delete request contains a DDID and the associated owner token. The delete module 335 verifies that the received token grants delete privileges and, if it does, deletes the DD identified by the DDID from the node 140. In another embodiment, delete module 335 may delete one or more messages stored in a DD and not the entire DD itself. In one embodiment, the delete module 335 writes data to the storage location from which the DD is deleted. This writeover data may be randomly generated or predetermined. Writing writeover data makes recovering deleted data more difficult. It also makes finding DD data more difficult by increasing the total amount of stored data in the storage location, with the multiple instances of writeover data obfuscating DD data.

A notification module 340 provides notifications to recipients 110 regarding changes to DDs. In one embodiment, the notification module 340 of a node 140 receives a notification request from a recipient 110 or another entity. The notification request 110 includes the DDID of the node for which the notification is to be created and a token (e.g., owner token, read token) associated with the DDID. The notification request may also indicate the types of events (i.e., changes to the DD) for which notifications are requested. For example, the notification request may specify that notifications are to be made for only writes to a DD. The notification request further includes a notification address to which a notification is to be made when there is a change to the identified DD. In another embodiment, the notification address may be specified in the form of a DDID and write token for a different DD in the domain 130. The notification address may also be specified as a different form of address, such as an address on the Internet to which an email or another form of message may be sent.

If the token for a DDID in a notification request is correct, the notification module 340 examines the notification request to identify the type of event for which the notification is requested. The notification module 340 then creates a notification for the event. In one embodiment, the notification module 340 establishes a trigger that detects when the appropriate type of event occurs for the identified DD. To this end, the notification module 340 may monitor the activities of the other modules (e.g., the write module 315) to determine when such events occur. For example, if the notification request specifies a write event, the notification module 340 may monitor the write module 315 to detect writes to the indicated DD.

When the requested event is detected, the notification module 340 generates and sends a notification to the specified notification address. The notification may identify the DD to which the event occurs (e.g., by including the DDID in the notification) and the type of event that occurred (e.g., a write to the DD having the DDID). If the notification address is for a DD, the notification module 340 acts as a sender 120 and uses the write token and DDID specified in the notification request to write the notification to the DD. In this example, the recipient 110 or other entity that requested the notification can monitor a single DD to receive notifications about events occurring in multiple different DDs. If the notification address is specified as a different form of address, the notification module 340 sends the notification using the appropriate technique for the address.

A geo-fence module 345 receives and analyzes geographic-related restrictions associated with the DD or requests received by the DD. The geo-fence module 345 communicates with the other modules in the DD to enforce such restrictions. The restrictions may specify that a DD is only accessible by senders and recipients within a geographic area specified by the creator of the DD. Access may be restricted in various ways in different embodiments. For example, in one embodiment, requests received by a DD may be valid only if the originator of the request is located within a certain geographic area. In another embodiment, a DD or specific contents of the DD may be accessible only if a specified party (e.g., owner, recipient, sender, third party, etc.) is within a certain geographic area. The geo-fence module 345 may also communicate with the notification module 340 to send notifications when events (e.g., write requests, read requests, etc.) occur within specified geographic areas.

Figure 4:
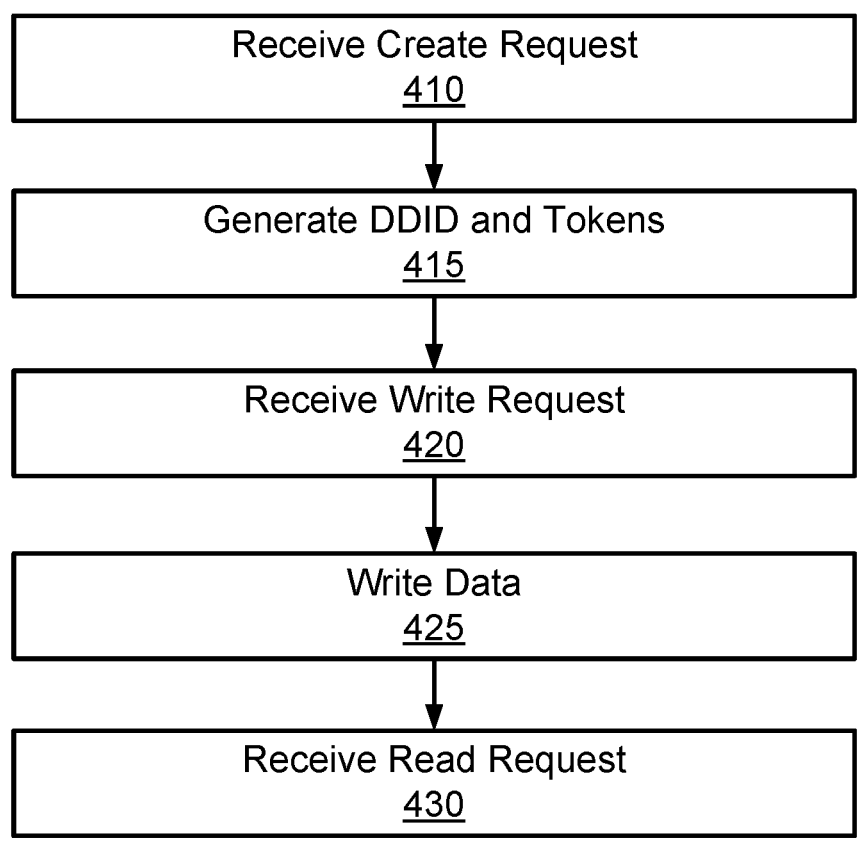
FIG. 4 is a flowchart illustrating steps for using a dead drop to pass data from a sender to a recipient according to one embodiment.

FIG. 4 is a flowchart illustrating steps for using a DD to pass data from a sender 120 to a recipient 110 according to one embodiment. FIG. 4 describes the steps from the perspective of a node 140 of a domain 130. Other embodiments may include different and/or other steps than those described herein, and the steps may be performed in different orders. Likewise, some or all of the steps may be performed by entities other than the node 140 in other embodiments.

The node 140 receives 410 a create request. As described above, a recipient 110 can issue the create request and send the request to an ingress node 140A in the domain 130. The ingress node 140A randomly selects a node to service the request. Assume, then, that the node 140 receives 410 the create request after having been randomly selected to service it. In response to the create request, the node 140 generates 415 a DDID and a set of associated tokens for the new DD. In addition, the node 140 may allocate storage space for storing data written to the DD. The node 140 provides the tokens and DDID to the recipient 110.

Subsequently, the node 140 receives 420 a write request including the DDID and associated write token. The write request may have been issued by a sender 120 who received the DDID and write token from the recipient 110. The sender 120 sends the write request to an ingress node 140L in the domain 130 which, in turn, forwards the write request to other nodes in the domain until it reaches the node that created the DD associated with the DDID. The node 140 determines whether the write token is valid. If the token is valid, the node 140 responds to the write request by establishing a connection with the sender's ingress node 140L. The node 140 receives the data to be written to the DD from the sender 120 via the ingress node 140L and stores 425 the data in the DD. If the token is not valid, an embodiment of the node 140 does not respond to the write request.

The node 140 later receives 430 a read request including the DDID and associated read token. The read request may have been issued by the recipient 110 who established the DD identified by the DDID. Similar to a write request, the recipient 110 sends the read request to an ingress node 140A in the domain 130 which forwards the read request to other nodes in the domain until it reaches the node that created the DD associated with the DDID. Upon receiving the read request, the node 140 determines whether the read token is valid. If the token is valid, the node 140 responds to the read request by establishing a connection with the recipient's ingress node 140A and sends it the data from the DD. For example, if the DD is maintained as a queue, the node 140 will send the data that is next in the queue.

Figure 5:
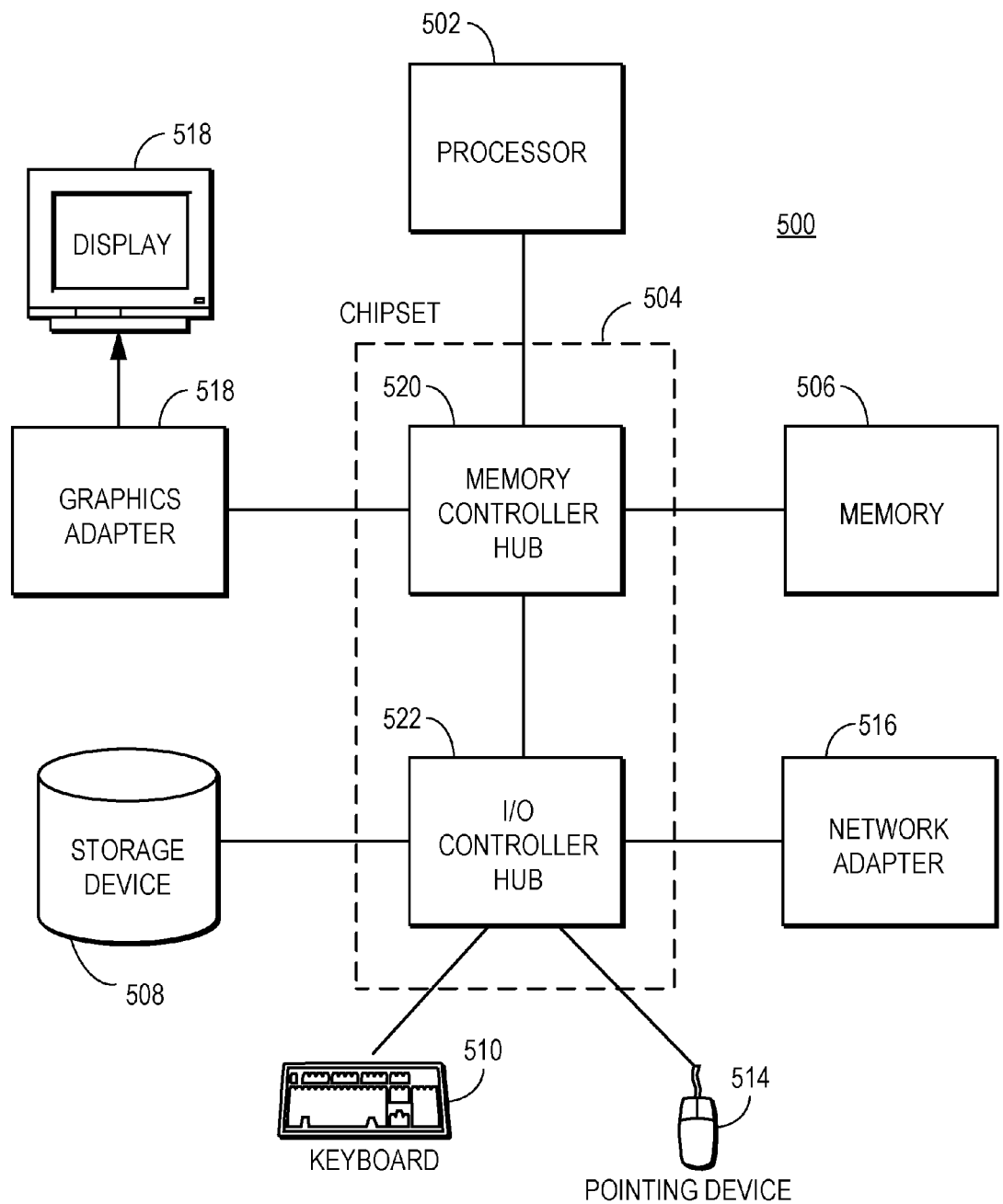
FIG. 5 is a high-level block diagram illustrating physical components of a computer used as part or all of one or more of the entities described herein in one embodiment.

FIG. 5 is a high-level block diagram illustrating physical components of a computer 500 used as part or all of one or more of the entities described herein in one embodiment. For example, instances of the illustrated computer 500 may be used as the recipient 110, sender 120, and/or a node 140 in the domain 130. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504. In one embodiment, one or more sound devices (e.g., a loudspeaker, audio driver, etc.) is coupled to chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as a node 140 may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The above description is included to illustrate the operation of certain embodiments and is not meant to limit the scope of the invention. From the above discussion, many variations will be apparent to one skilled in the relevant art that would yet be encompassed by the spirit and scope of the invention.

What is claimed is:

1. A method for exchanging data between a sender and a recipient comprising:
  receiving, at a first node of a plurality of nodes of a dead drop domain, a write request from the sender to write data to a specified dead drop of a plurality of dead drops in the dead drop domain, wherein each dead drop of the plurality of dead drops is a distinct storage location on a node of the plurality of nodes and identified by a unique dead drop identifier (DDID), each node of the plurality of nodes comprising a processor and a memory and connected to one or more other nodes via a network;
  determining whether the first node has the specified dead drop;
  responsive to determining that the first node does not have the specified dead drop, accessing, by the first node, a routing table identifying a second node of the plurality of nodes in the dead drop domain to which the first node is connected, the routing table stored in a memory of the first node;
  forwarding the write request from the first node to the second node;
  receiving the write request at the second node;
  determining whether the second node has the specified dead drop; and responsive to determining that the second node has the specified dead drop, writing the data to the specified dead drop.

2. The method of claim 1, further comprising:
receiving, at the second node a create request from a requestor;
creating the specified dead drop at the second node responsive to receiving the create request;
automatically generating a DDID identifying the specified dead drop, a write token associated with the specified dead drop, and a read token associated with the specified dead drop; and
providing the DDID identifying the specified dead drop, the write token, and the read token to the requestor.

3. The method of claim 2, further comprising:
receiving a write token from the sender as part of the write request and
comparing the write token from the sender with the write token associated with the specified dead drop to determine whether the write token from the sender is valid, wherein the data is written to the specified dead drop responsive to a determination that the write token from the sender is valid.

4. The method of claim 2, further comprising:
receiving, at the second node, a read request from the recipient, the read request comprising a read token;
comparing the read token received from the recipient with the read token associated with the specified dead drop to determine whether the read token from the recipient is valid; and
responsive to a determination that the read token from the recipient is valid, providing the data from the specified dead drop to the recipient.

5. The method of claim 1, further comprising:
evaluating time-to-live (TTL) information for the specified dead drop, the TTL information specifying a duration for retaining the specified dead drop at the second node;
determining whether the duration specified by the TTL information has been reached; and
deleting the specified dead drop responsive to a determination that the duration specified by the TTL information has been reached.

6. The method of claim 1, further comprising:
receiving, at the second node, a move request to move the specified dead drop to a third node of the plurality of nodes of the dead drop domain, the move request comprising an associated token;
determining whether the token associated with the move request is valid; and
responsive to determining that the token associated with the move request is valid, moving the specified dead drop to the third node of the plurality of nodes of the dead drop domain.

7. The method of claim 1, further comprising:
receiving, at the second node, a notification request for the specified dead drop, the notification request specifying a type of event for which a notification is requested and a notification address to which the notification is to be made; and
creating a trigger that causes the notification to be sent to the notification address responsive to the identified type of event occurring at the specified dead drop.

8. A system for exchanging data between a sender and a recipient comprising:
a processor for executing computer program instructions; and
a non-transitory computer-readable storage medium storing computer program instructions executable by the processor to perform steps comprising:
receiving, at a first node of a plurality of nodes of a dead drop domain, a write request from the sender to write data to a specified dead drop of a plurality of dead drops in the dead drop domain, wherein each dead drop of the plurality of dead drops is a distinct storage location on a node of the plurality of nodes and identified by a unique dead drop identifier (DDID), and each node of the plurality of nodes is connected to one or more other nodes via a network;
determining whether the first node has the specified dead drop;
responsive to determining that the first node has the specified dead drop, writing the data to the specified dead drop;
responsive to determining that the first node does not have the specified dead drop:
accessing, by the first node, a routing table identifying a second node of the plurality of nodes in the dead drop domain to which the first node is connected, the routing table stored in a memory of the first node; and
forwarding the write request from the first node to the second node.

9. The system of claim 8, the steps further comprising:
receiving, at the first node, a create request from a requestor;
creating the specified dead drop at the first node responsive to receiving the create request
automatically generating a DDID identifying the specified dead drop, a write token associated with the specified dead drop, and a read token associated with the specified dead drop; and
providing the DDID identifying the specified dead drop, the write token, and the read token to the requestor.

10. The system of claim 9, the steps further comprising:
receiving a write token from the sender as part of the write request; and
comparing the write token from the sender with the write token associated with the specified dead drop to determine whether the write token from the sender is valid, wherein the data is written to the specified dead drop responsive to a determination that the write token from the sender is valid.

11. The system of claim 8, the steps further comprising:
evaluating time-to-live (TTL) information for the specified dead drop, the TTL information specifying a duration for retaining the specified dead drop at the first node;
determining whether the duration specified by the TTL information has been reached; and
deleting the specified dead drop responsive to a determination that the duration specified by the TTL information has been reached.

12. The system of claim 8, the steps further comprising:
receiving, at the first node, a move request to move the specified dead drop to a third node of the plurality of nodes of the dead drop domain, the move request comprising an associated token;
determining whether the token associated with the move request is valid; and
responsive to determining that the token associated with the move request is valid, moving the specified dead drop to the third node of the plurality of nodes of the dead drop domain.

13. The system of claim 8, the steps further comprising:
receiving, at the first node, a notification request for the specified dead drop, the notification request specifying a type of event for which a notification is requested and a notification address to which the notification is to be made; and
creating a trigger that causes the notification to be sent to the notification address responsive to the identified type of event occurring at the specified dead drop.

14. A non-transitory computer-readable storage medium storing computer program instructions executable by a processor to perform steps comprising:
receiving, at a first node of a plurality of nodes of a dead drop domain, a write request from the sender to write data to a specified dead drop of a plurality of dead drops in the dead drop domain, wherein each dead drop of the plurality of dead drops is a distinct storage location on a node of the plurality of nodes and identified by a unique dead drop identifier (DDID), and each node of the plurality of nodes is connected to one or more other nodes via a network;
determining whether the first node has the specified dead drop;
responsive to determining that the first node has the specified dead drop, writing the data to the specified dead drop;
responsive to determining that the first node does not have the specified dead drop:
  accessing, by the first node, a routing table identifying a second node of the plurality of nodes in the dead drop domain to which the first node is connected, the routing table stored in a memory of the first node; and
  forwarding the write request from the first node to the second node.

15. The non-transitory computer-readable storage medium of claim 14, the steps further comprising:
receiving, at the first node, a create request from a requestor;
creating the specified dead drop at the first node responsive to receiving the create request;
automatically generating a DDID identifying the specified dead drop, a write token associated with the specified dead drop, and a read token associated with the specified dead drop; and
providing the DDID identifying the specified dead drop, the write token, and the read token to the requestor.

16. The non-transitory computer-readable storage medium of claim 15, the steps further comprising:
receiving a write token from the sender as part of the write request and
comparing the write token from the sender with the write token associated with the specified dead drop to determine whether the write token from the sender is valid, wherein the data is written to the specified dead drop responsive to a determination that the write token from the sender is valid.

17. The non-transitory computer-readable storage medium of claim 15, the steps further comprising:
evaluating time-to-live (TTL) information for the specified dead drop, the TTL information specifying a duration for retaining the specified dead drop at the first node;
determining whether the duration specified by the TTL information has been reached; and
deleting the specified dead drop responsive to a determination that the duration specified by the TTL information has been reached.

18. The non-transitory computer-readable storage medium of claim 15, the steps further comprising:
receiving, at the first node a move request to move the specified dead drop to a third node of the plurality of nodes of the dead drop domain, the move request comprising an associated token;
determining whether the token associated with the move request is valid; and
responsive to determining that the token associated with the move request is valid, moving the specified dead drop to the third node of the plurality of nodes of the dead drop domain.

\* \* \* \* \*

UNITED STATES PATENT AND TRADEMARK OFFICE
CERTIFICATE OF CORRECTION

PATENT NO. : 9,667,477 B2  
APPLICATION NO. : 15/136311  
DATED : May 30, 2017  
INVENTOR(S) : Martin Kacin and Michael R. Gray Page 1 of 1

It is certified that error appears in the above-identified patent and that said Letters Patent is hereby corrected as shown below:

In the Claims

Claim 2, Column 15, Line 5, "the second node a create" to read as -- the second node, a create --
Claim 3, Column 15, Line 17, "request and" to read as -- request; and --
Claim 9, Column 16, Line 31, "the create request" to read as -- the create request; --
Claim 16, Column 18, Line 10, "request and" to read as -- request; and --
Claim 18, Column 18, Line 31, "the first node a move" to read as -- the first node, a move --

Signed and Sealed this  
Thirteenth Day of March, 2018

Andrei Iancu  
*Director of the United States Patent and Trademark Office*